(12) United States Patent
Wang et al.

(10) Patent No.: US 12,513,495 B2
(45) Date of Patent: Dec. 30, 2025

(54) 5G MESSAGE PROCESSING METHOD, 5G MESSAGE CENTER, TERMINAL AND STORAGE MEDIUM

(71) Applicant: ZTE CORPORATION, Shenzhen (CN)

(72) Inventors: Di Wang, Shenzhen (CN); Cuiping Yang, Shenzhen (CN); Dong Xie, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 350 days.

(21) Appl. No.: 18/550,573

(22) PCT Filed: Oct. 9, 2021

(86) PCT No.: PCT/CN2021/122887
§ 371 (c)(1),
(2) Date: Sep. 14, 2023

(87) PCT Pub. No.: WO2022/193622
PCT Pub. Date: Sep. 22, 2022

(65) Prior Publication Data
US 2024/0298150 A1    Sep. 5, 2024

(30) Foreign Application Priority Data
Mar. 15, 2021    (CN) .......................... 202110277498.6

(51) Int. Cl.
*H04W 4/14*    (2009.01)
*H04W 4/06*    (2009.01)
*H04W 28/08*    (2023.01)

(52) U.S. Cl.
CPC .............. *H04W 4/14* (2013.01); *H04W 4/06* (2013.01); *H04W 28/08* (2013.01)

(58) Field of Classification Search
CPC ......... H04W 4/14; H04W 4/06; H04W 28/08; H04W 40/00; H04W 4/08; H04W 4/12;
(Continued)

(56) References Cited

U.S. PATENT DOCUMENTS

2019/0158985 A1    5/2019  Dao et al.
2019/0166074 A1*   5/2019  Voss ........................ H04L 51/10
(Continued)

FOREIGN PATENT DOCUMENTS

CN    101867619 A    10/2010
CN    106412001 A    2/2017
(Continued)

OTHER PUBLICATIONS

International Searching Authority. International Search Report and Written Opinion for PCT Application No. PCT/CN2021/122887 and English translation, mailed Jan. 6, 2022, pp. 1-10.
(Continued)

*Primary Examiner* — Huy C Ho
(74) *Attorney, Agent, or Firm* — Vivacqua Crane, PLLC

(57) ABSTRACT

Disclosed are a 5th generation (5G) message processing method, a 5G message center, a terminal device, and a storage medium. The 5th Generation (5G) message processing method may include: determining a first node and a second node from all nodes which are to receive a 5G message, and generating a first list according to node information of the first node, wherein the first node and the second node belong to the 5G message center; sending, to the first node, a group-sending file corresponding to the 5G message; and delivering, to the second node, a notification message comprising the first list and a group-sending notification, such that the second node acquires the group-sending file from at least one first node in the first list according to the group-sending notification.

17 Claims, 7 Drawing Sheets

(58) Field of Classification Search
CPC .. H04W 12/06; H04W 12/106; H04L 12/189;
H04L 51/224; H04L 51/04; H04L
2209/80; H04L 9/0869; H04L 63/0807;
H04L 9/3213; H04L 67/06
USPC ......................................................... 455/466
See application file for complete search history.

(56) References Cited

U.S. PATENT DOCUMENTS

2020/0059761 A1     2/2020  Li et al.
2022/0159768 A1*    5/2022  Zhu .................. H04L 1/1874
2022/0201638 A1*    6/2022  Arrobo Vidal ........ H04W 48/08

FOREIGN PATENT DOCUMENTS

CN      108768675  A    11/2018
CN      109525497  A     3/2019
WO     2019189963  A1   10/2019

OTHER PUBLICATIONS

European Patent Office. Extended European Search Report for EP Application No. 21931197.4, mailed Jul. 5, 2024, pp. 1-9.

* cited by examiner

5G MESSAGE PROCESSING METHOD, 5G MESSAGE CENTER, TERMINAL AND STORAGE MEDIUM

CROSS-REFERENCE TO RELATED APPLICATION

This application is a national stage filing under 35 U.S.C. § 371 of international application number PCT/CN2021/122887, filed Oct. 9, 2021, which claims priority to Chinese patent application No. 202110277498.6, filed Mar. 15, 2021. The contents of these applications are incorporated herein by reference in their entirety.

TECHNICAL FIELD

The present disclosure relates to the field of communication technologies, and more particularly, to a 5th generation (5G) message processing method, a 5G message center, a terminal device, and a storage medium.

BACKGROUND 5G messaging is an upgrade of short message services. It takes traditional mobile phone short messages as the entrance and provides users with enhanced message service. It can provide users with sending and receiving of media contents such as text, pictures, audio, video, locations, and contacts. It has numerous functions of chat, group chat, small programs and other service applications (APP) of Over The Top (OTT) applications, and has great development prospects.

At present, 5G messages are sent through a 5th Generation Message Center (5GMC), which provides rich media communication services to user terminal devices in the form of a central server node. With the increasing quantity of users, mass sending of 5G messages brings pressure on bandwidth, disk Input/Output (IO), computing power, costs, and management to the 5G message center, affecting the service quality of the 5G message center in the scenario of mass sending of 5G messages.

SUMMARY

The following is a summary of the subject matter set forth in the description. This summary is not intended to limit the scope of protection of the claims.

Embodiments of the present disclosure provides a 5G message processing method, a 5G message center, a terminal device, and a storage medium, to reduce the communication burden caused by mass sending of messages by the 5G message center and improve the capability and efficiency of the 5G message center in processing 5G messages.

In accordance with a first aspect of the present disclosure, an embodiment provides a 5G message processing method, which is applied to a 5G message center. The method includes: determining a first node and a second node from all nodes which are to receive a 5G message, and generating a first list according to node information of the first node, wherein the first node and the second node belong to the 5G message center; sending, to the first node, a group-sending file corresponding to the 5G message; and delivering, to the second node, a notification message comprising the first list and a group-sending notification, such that the second node acquires the group-sending file from at least one first node in the first list according to the group-sending notification.

In accordance with a second aspect of the present disclosure, an embodiment provides a 5G message processing method, which is applied to a first node. The method includes: acquiring a group-sending file corresponding to a 5G message and delivered by a 5G message center; and sending the group-sending file to a second node when receiving a file acquisition request sent by the second node according to a group-sending notification, where the group-sending notification is sent to the second node by the 5G message center, and the first node and the second node belong to the 5G message center.

In accordance with a third aspect of the present disclosure, an embodiment provides a 5G message processing method, which is applied to a second node. The method includes: receiving a notification message including a first list and a group-sending notification from a 5G message center, where the first list is generated by the 5G message center according to node information of a first node, and the first node stores a group-sending file directly sent by the 5G message center; and sending a file acquisition request to at least one first node in the first list according to the group-sending notification to acquire the group-sending file from the at least one first node.

In accordance with a fourth aspect of the present disclosure, an embodiment provides a 5G message center, including at least one processor and a memory communicatively connected to the at least one processor, where the memory stores an instruction executable by the at least one processor which, when executed by the at least one processor, causes the at least one processor to implement the 5G message processing method of the first aspect.

In accordance with a fifth aspect of the present disclosure, an embodiment provides a terminal device, including at least one processor and a memory communicatively connected to the at least one processor, where the memory stores an instruction executable by the at least one processor which, when executed by the at least one processor, causes the at least one processor to implement the 5G message processing method of the second aspect or the 5G message processing method of the third aspect.

In accordance with a sixth aspect of the present disclosure, an embodiment provides a computer-readable storage medium, storing a computer-executable instruction which, when executed by a computer, causes the computer to execute the 5G message processing method of the first aspect, the 5G message processing method of the second aspect, or the 5G message processing method of the third aspect.

Additional features and advantages of the disclosure will be set forth in the description which follows, and in part will be obvious from the description, or may be learned by the practice of the disclosure. The objects and other advantages of the present disclosure can be realized and obtained by the structures particularly pointed out in the description, claims and accompanying drawings.

BRIEF DESCRIPTION OF DRAWINGS

The drawings are provided for a further understanding of the technical schemes of the present disclosure, and constitute a part of the description. The drawings and the embodiments of the present disclosure are used to illustrate the technical schemes of the present disclosure, and do not constitute a limitation to the technical schemes of the present disclosure.

DETAILED DESCRIPTION

To make the objects, technical schemes, and advantages of the present disclosure clear, the present disclosure is described in further detail in conjunction with accompanying drawings and embodiments. It should be understood that the specific embodiments described herein are merely used for illustrating the present disclosure, and are not intended to limit the present disclosure.

At present, a 5G message center serves as a central server to send a 5G message to nodes which are to receive the 5G message. In other words, one 5G message center sends a 5G message to all nodes belonging to the 5G message center. When the quantity of nodes is small, the 5G message center has sufficient resources to handle group-sending tasks. However, with the increasing quantity of nodes and the increasing requirements on the real-time performance of 5G messages (e.g., group-sending 5G messages related to earthquakes, tsunamis, etc.), the 5G message center faces the pressure of bandwidth, disk IO, computing power, and management when performing group-sending tasks, restricting the processing capacity and processing efficiency of the 5G message center. In addition, if the 5G message center serving as the central server is faulty, an application system of the 5G message center will lose its management and control capabilities, and mass sending of 5G messages will be interrupted, resulting in unsatisfactory user experience.

In view of the above, the embodiments of the present disclosure provide a 5G message processing method, a 5G message center, a terminal device, and a storage medium. All nodes belonging to a 5G message center are classified into a first node and a second node. When the 5G message center needs to send a 5G message to all the nodes, the 5G message center sends a group-sending file to only the first node, and the second node acquires the group-sending file from the first node. This reduces the communication burden caused by centralized mass sending of 5G messages by the 5G message center and improves the processing capability and processing efficiency of the 5G message center in mass sending.

The embodiments of the present disclosure will be further described in detail below in conjunction with the accompanying drawings.

Figure 1:
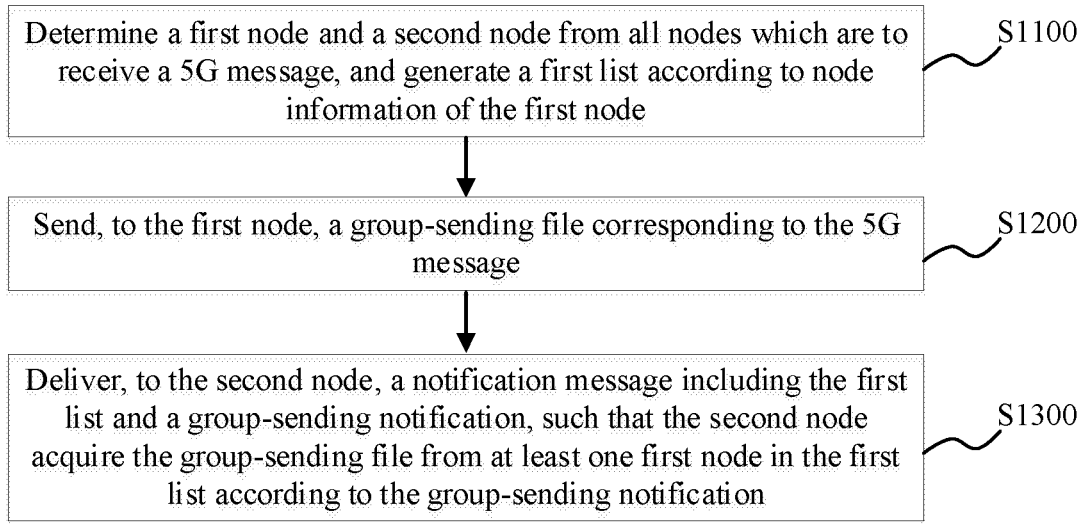
FIG. 1 is an overall flowchart of a 5G message processing method executed by a 5G message center according to an embodiment of the present disclosure.

Referring to FIG. 1, an embodiment of the present disclosure provides a 5G message processing method, which is applied to a 5G message center. The method includes, but not limited to, the following steps S1100, S1200, and S1300.

At S1100, a first node and a second node are determined from all nodes which are to receive a 5G message, and a first list is generated according to node information of the first node, where the first node and the second node belong to the 5G message center.

Based on a network architecture adopted by the current 5G message center, all nodes belonging to the same 5G message center are classified into a first node and a second node. The first node serves as a seed node to provide a group-sending file to the second node, and the second node serves as an ordinary node to pull the group-sending file from the first node. Therefore, to enable the second node to acquire information of the first node, the 5G message center further integrates the node information of the first node obtained through classification to generate the first list, and provides the first list to the second node as a seed node list. It should be understood that to facilitate the 5G message center in managing the nodes which are to receive the 5G message, both the first node and the second node belong to the 5G message center, such that when processing a group-sending task, the 5G message center can easily determine whether the nodes have completed receiving of the group-sending file, thereby realizing reliable group-sending control.

At S1200, a group-sending file corresponding to the 5G message is sent to the first node.

When the 5G message center needs to group-send a 5G message, the 5G message center creates a group-sending task, and then sends a group-sending file corresponding to the 5G message to the first node serving as a seed node, so that the first node stores the group-sending file in advance, for the second node to download the group-sending file.

At S1300, a notification message including the first list and a group-sending notification is delivered to the second node, such that the second node acquires the group-sending file from at least one first node in the first list according to the group-sending notification.

When the first node has received the group-sending file, the 5G message center sends a notification message to the second node. The notification message includes a first list recording the node information of the first node and a group-sending notification for informing the second node to acquire the group-sending file. Based on the notification message, the second node selects at least one first node from the first list and pulls the group-sending file from the selected at least one first node. In this way, all nodes belonging to the 5G message center can receive the group-sending file corresponding to the group-sending task, and the 5G message center only undertakes the communication load brought by sending the group-sending file to the first node and the resource consumption brought by managing the nodes. Therefore, compared with the centralized group-sending processing mode, the use of the method of the embodiments of the present disclosure in the 5G message center can greatly reduce the amount of data transmitted and the disk IO load of the server during group-sending task processing, and improve the capability and efficiency of the 5G message center in processing the group-sending task, thereby improving the experience of terminal device users.

It can be understood that in the embodiments of the present disclosure, as a device for receiving 5G messages, a node may be different types of smart terminal devices, such as a smart phone, a tablet computer, and a small terminal device, and has a function of receiving various messages and files sent by a 5G message center. For example, a first node needs to have a function of receiving a group-sending file from a 5G message center and a function of sending the group-sending file to a second node in response to a file acquisition request from the second node. The second node needs to have a function of receiving a notification message sent by a 5G message center and a function of requesting to pull the group-sending file from the first node. It should be understood that the types and functions of the nodes are described by way of example only and are not intended to limit the nodes. Any node configured to respond to the above method implemented by the 5G message center can be used in the embodiments of the present disclosure without departing from the technical schemes of the embodiments of the present disclosure.

It should be noted that, in S1100, an initial value of the first list may be fixed for each group-sending task, or may be regenerated according to each group-sending task. When mobility of first nodes selected as the seed nodes in a region is not high, these first nodes may be recorded in the first list fixedly, and for each group-sending task, the group-sending file is first sent to these first nodes. If mobility of nodes in the region is high or the states of nodes change rapidly, it is not proper to fixedly select some nodes as seed nodes, and seed nodes may be re-selected for each group-sending task.

Figure 13:
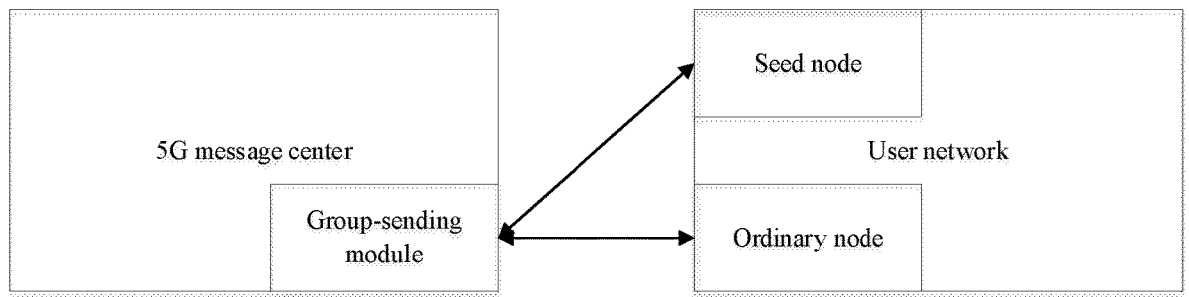
FIG. 13 is a schematic diagram showing connection between modules in a system according to an embodiment of the present disclosure.

The 5G message center implements the classification of nodes and the processing of the group-sending task by performing the above steps S1100 to S1300. In fact, the network architecture where the 5G message center is located may have different forms. Depending on the specific network architecture, the 5G message center performs the above steps based on different modules. For example, referring to FIG. 13, the 5G message center includes a group-sending module, which is connected to one or more user networks through its own group-sending interface. According to S1100, nodes in each user network are classified into a seed node and an ordinary node based on the manner of classifying the first node and the second node. In this way, after the 5G message center creates a group-sending task, the group-sending module sends a group-sending file corresponding to the group-sending task to the seed node, such that the seed node can share the group-sending file with the ordinary node, thereby realizing Peer to Peer (P2P) transmission. Moreover, the group-sending module also receives receipt messages fed back by the ordinary node, such that the 5G message center can collect statistics on the completion status of the current group-sending task and perform processing. Based on the characteristics of P2P transmission, an ordinary node may pull only one file block of the group-sending file from a seed node, and pull other file blocks of the group-sending file from other seed nodes. Because the quantity of seed nodes is often more than one, the rapid sharing of the group-sending file can be realized, thereby shortening the time required for completing the group-sending task.

The user networks may be a plurality of complete local networks, and a device having a management function corresponding to the group-sending module may be arranged in the local network. For example, a local network has a base station device corresponding to the group-sending module, and the group-sending module may hand over part of a distribution task to the base station device for execution. For example, for the distribution of the first list, the group-sending module sends the original first list to the base station device, and the base station device forwards the first list to nodes in the current user network. In this embodiment, only some functions of the user network are described by way of example, and the specific functions of the user network are not limited thereto.

Figure 2:
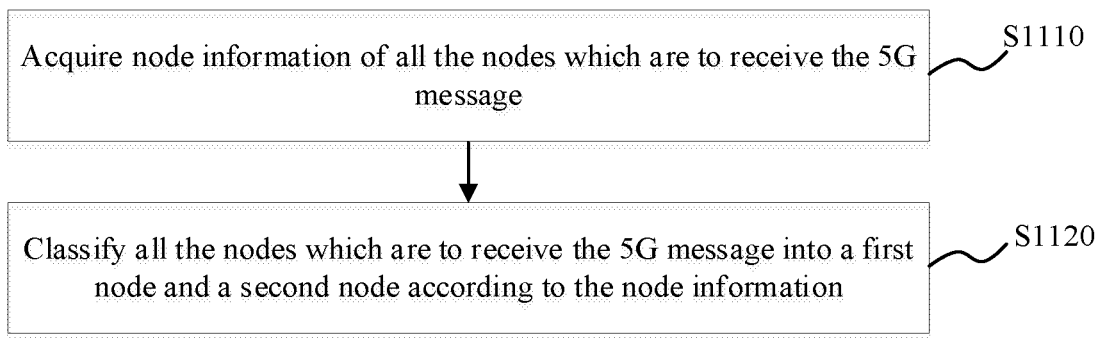
FIG. 2 is a method flowchart of classification of a first node and a second node according to an embodiment of the present disclosure.

It can be understood that in the above step S1100, the 5G message center can determine the first node and the second node from all the nodes which are to receive the 5G message, by performing the following steps S1110 and S1120, as shown in FIG. 2.

At S1110, node information of all the nodes which are to receive the 5G message is acquired, where the node information is used for characterizing a network attribute of the nodes which are to receive the 5G message.

At S1120, all the nodes which are to receive the 5G message are classified into a first node and a second node according to the node information.

The 5G message center classifies all the nodes into the first node (seed node) and the second node (ordinary node) according to a specific rule, and the node information of all the nodes needs to be acquired in advance in order to apply the rule. In an embodiment of the present disclosure, all the nodes are classified according to different data in the node information. For example, the first node and the second node may be determined according to link distances between the nodes and the 5G message center, according to transmission delays and packet loss rates between the nodes and the 5G message center, according to hardware performance of the nodes, and so on.

It can be understood that all the nodes which are to receive the 5G message in the embodiments of the present disclosure may not be all nodes belonging to the 5G message center, because the group-sending task currently created by the 5G message center may be group-sending to only a part of nodes belonging to the 5G message center. This part of nodes is referred to as all the nodes which are to receive the 5G message. Therefore, it can be understood that the classification of the first node and the second node is performed for all the nodes which are to receive the 5G message. As can be learned according to the above classification method, the 5G message center has a second list. The node information of all the nodes belonging to the 5G message center is recorded in the second list. When performing group-sending and classification of nodes, the 5G message center can learn the information of each node by querying the second list, so as to facilitate node management. It can be understood that the node information is used for representing the network attribute of the node in the current network, including a status and a parameter. For example, the node information includes, but not limited to, a node name, an IP address and a physical address of the node, a telecommunications operator to which the node belongs, a telecommunications operator number corresponding to the node, whether the node is online or not, etc.

Figure 3:
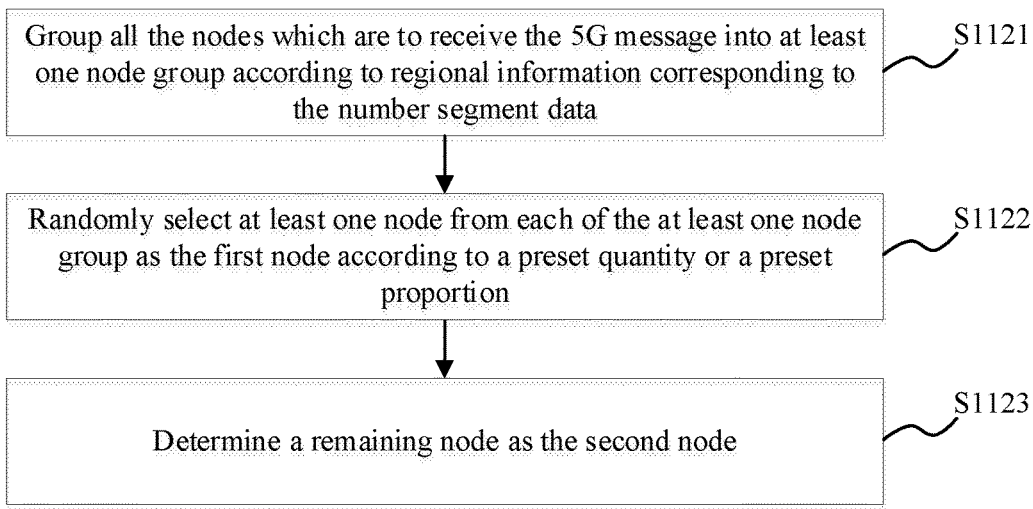
FIG. 3 is a method flowchart of selecting a seed node according to an embodiment of the present disclosure.

Referring to FIG. 3, when the node information corresponding to all the nodes which are to receive the 5G message includes number segment data, the node classification in S1120 may be implemented by performing the following steps S1121 to S1123.

At S1121, all the nodes which are to receive the 5G message are grouped into at least one node group according to regional information corresponding to the number segment data.

The number segment data may be a mobile phone number, an International Mobile Subscriber Identity (IMSI), etc. Taking the mobile phone number as an example, the nodes are classified by geographic regions according to home location information of the mobile phone numbers provided by telecommunications operators. For example, all nodes whose mobile phone numbers correspond to a same home location which is city A are grouped into a first group, and all nodes whose mobile phone numbers correspond to a same home location which is city B are grouped into a second group. As such, different groups corresponding to different regions are obtained. Of course, with the advancement of mobile number portability, there may be some errors in the classification according to home locations of mobile phone numbers. Therefore, different nodes may alternatively be classified based on IMSIs. The classification based on IMSIs will not be described in detail herein. The advantage of classification by geographic region information is that nodes (user terminal devices) that are likely to be close to each other are selected and grouped into one group, to prevent a large quantity of nodes in different regions from pulling the group-sending file from each other, thereby reducing the generation of cross-regional traffic.

At S1122, at least one node is randomly selected from each of the at least one node group as the first node according to a preset quantity or a preset proportion.

At S1123, a remaining node is determined as the second node.

After all the nodes which are to receive the 5G message are grouped into several node groups according to geographic regions, a plurality of first nodes need to be selected from each node group as seed nodes. For example, a plurality of first nodes are selected according to a preset quantity (for example, 10 nodes) or a plurality of first nodes are selected according to a preset proportion (for example, 5% to 10% of a total quantity of nodes). This ensures that each node group includes both seed nodes and ordinary nodes, providing a network foundation for P2P transmission.

For countries or regions where a small quantity of sites are deployed for the 5G message system, for example, for countries where the quantity of users using the 5G message system is small, there are not many targets for the 5G message center to group-send a message. In this case, when the method of the embodiments of the present disclosure is used, the first nodes and the second nodes may be classified according to a random selection rule. For example, a plurality of nodes are randomly selected as the first nodes from all the nodes which are to receive the 5G message, and the remaining nodes are determined as the second nodes. Such a selection method is relatively simple, and is obviously suitable for use in regions with a small quantity of nodes.

In some cases, although the 5G message center selects a suitable quantity of seed nodes according to the above rule, not all the first nodes selected as seed nodes may operate normally. Therefore, after selecting seed nodes, the 5G message center may further determine which seed nodes can operate normally, and perform a subsequent group-sending operation only when a sufficient quantity of seed nodes can operate normally (for example, when the quantity of seed nodes operating normally reaches a set quantity threshold).

In some embodiments, the notification message further includes a file verification value corresponding to the group-sending file, and the file verification value is used by the second nodes to perform file verification on the group-sending file after acquiring the group-sending file. The file verification value of the group-sending file may be directly delivered to the second nodes by the 5G message center, or may be received by the second nodes from the 5G message center through forwarding by a management device in the user network. The function of the file verification value is to verify the correctness of the group-sending file when the second nodes complete the receiving of the group-sending file. It can be understood that there are many ways to verify a file, such as verifying a value of MD5, SHA1, or CRC32 to determine whether the file is complete and correct. The file verification manner is not limited in the embodiments of the present disclosure, and a corresponding file verification manner may be selected according to actual requirements.

Figure 4:
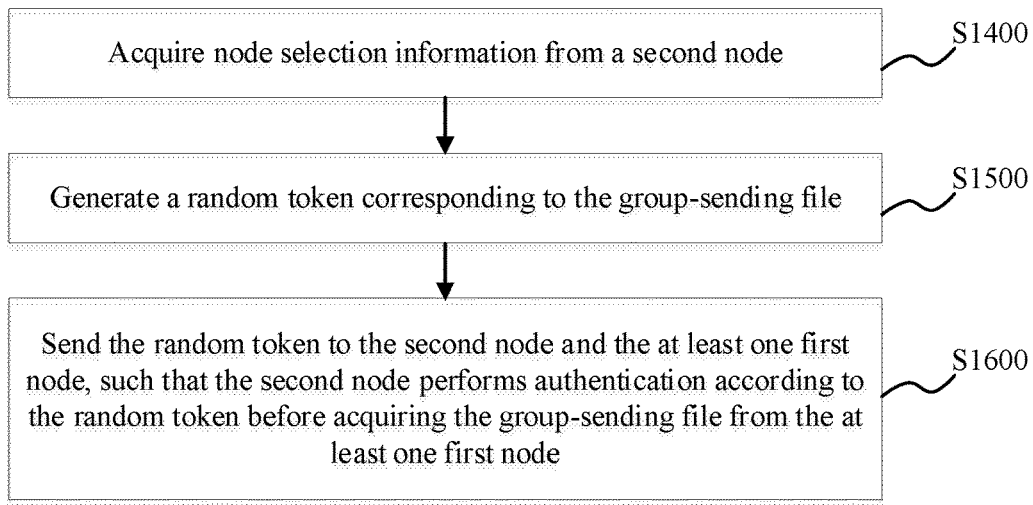
FIG. 4 is a method flowchart of a strong authentication mode executed by a 5G message center according to an embodiment of the present disclosure.

In the method of the embodiments of the present disclosure, a strong authentication mode may be adopted in the process of transmitting the group-sending file, so as to improve the success rate of correctly acquiring the group-sending file. Referring to FIG. 4, the method of the embodiments of the present disclosure further includes, but not limited to, the following steps S1400, S1500, and S1600.

At S1400, node selection information from a second node is acquired, where the node selection information includes node information of at least one first node selected by the second node from the first list.

The second node selects a plurality of first nodes from the first list for pulling the group-sending file. In this case, the strong authentication mode is entered. In this step, the second node is required to return a result of selecting the first nodes from the first list to the 5G message center, i.e., send the node selection information to the 5G message center. The 5G message center executes a following step of generating a random token according to information of the first nodes recorded in the node selection information.

At S1500, a random token corresponding to the group-sending file is generated.

The token is used to represent an object having permission to perform some operations. In this step, the 5G message center generates a random token for the group-sending file corresponding to the current group-sending task, for authentication before transmitting the group-sending file between the first node and the second node.

At S1600, the random token is sent to the second node and the at least one first node, such that the second node performs authentication according to the random token before acquiring the group-sending file from the at least one first node.

The 5G message center sends the generated random token to the second node and a plurality of first nodes selected by the second node. Since the random token corresponds to the group-sending file of the current group-sending task, the second node needs to carry the random token when pulling the group-sending file from the first nodes. Only when the first nodes also have the corresponding random token, the second node is allowed to pull the group-sending file; otherwise, the authentication fails, and the first nodes prohibit the second node from acquiring the group-sending file. This avoids erroneous pulling by the second node and improving the correctness of the group-sending file received by the second node.

It can be understood that after the strong authentication mode represented by the above steps S1400 to S1600 is executed, the file verification value of the group-sending file may further be compared (for example, the notification message further includes the file verification value corresponding to the group-sending file), so that the strong authentication mode is optional and is for the purpose of improving the success rate of receiving the group-sending file by the second node.

Figure 5:
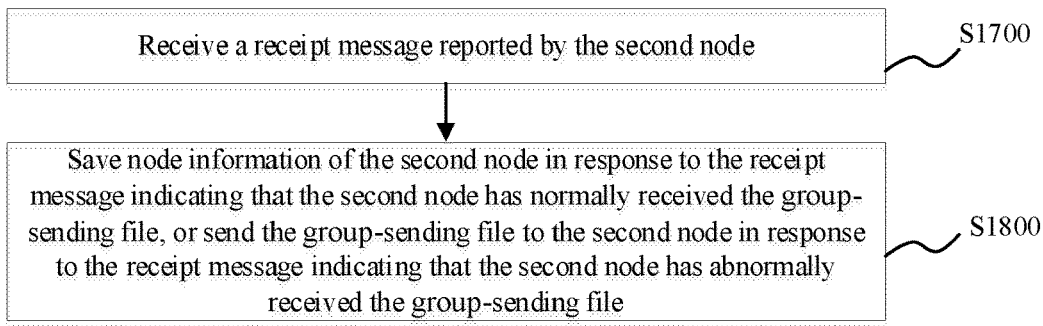
FIG. 5 is a method flowchart of processing performed by a 5G message center according to a receipt message according to an embodiment of the present disclosure.

After completing the receiving of the group-sending file, the second node needs to report a reception status to the 5G message center, such that the 5G message center can manage the completion status of the current group-sending task. Referring to FIG. 5, the 5G message center may perform the following steps S1700 and S1800.

At S1700, the 5G message center receives a receipt message reported by the second node.

At S1800, the 5G message center saves node information of the second node when the receipt message indicates that the second node has normally received the group-sending file, or sends the group-sending file to the second node when the receipt message indicates that the second node has abnormally received the group-sending file.

It can be understood that a plurality of fields may be configured in the receipt message to contain a variety of information. For example, a field may be configured to indicate that the second node has currently received the group-sending file, or according to a file verification process, a field may be configured in the receipt message to indicate whether the group-sending file currently received by the second node has passed the file verification. The 5G message center can learn the status of reception of the group-sending file by the second node by parsing the receipt message. Therefore, in some cases, "normally receive" includes information indicating that the second node has currently completely received the group-sending file and passed the file verification, and "abnormally receive" includes information indicating that the second node cannot completely receive the group-sending file or that the group-sending file has not passed the file verification.

To enable the 5G message center to determine the progress of the second node executing the group-sending task, the receipt message reported by the second node needs to include information indicating whether the group-sending file has been normally received. When the receipt message indicates that the second node has normally received the group-sending file (for example, it is determined, based on the passed file verification, that the group-sending file has been normally received), the 5G message center records the second node to a database and saves data, marking that the second node has completed the receiving of the group-sending file. When the receipt message indicates that the second node has not normally received the group-sending file (for example, the second node cannot receive the group-sending file because the file verification is not passed or the network is disconnected), it indicates that the second node cannot acquire the group-sending file from the first nodes. In this case, the 5G message center may directly send the group-sending file to the second node.

It can be understood that, when the second node cannot correctly acquire the group-sending file, node information of the first node from which the second node fails in acquiring the group-sending file, or referred to as a faulty first node, may further be recorded, and the recorded faulty node is reported to the 5G message center along with the receipt message. The 5G message center makes a judgment according to the node information in the receipt message, and processes the faulty first node. For example, the 5G message center sets a faulty node as a non-seed node and attempts to reset the node, and resets the node as a seed node after the node returns to normal.

To avoid the accumulation of group-sending tasks in the 5G message center, the 5G message center may regularly clear group-sending tasks. For example, a first preset time threshold is set for the 5G message center, and when a presence duration of the group-sending task corresponding to the group-sending file exceeds the first preset time threshold, the group-sending task is deleted. In other words, when the group-sending task expires, the 5G message center actively deletes the group-sending task. This step may be executed by the group-sending module of the 5G message center. It can be understood that, the group-sending file may also be cleared while clearing the group-sending task, so as not to occupy storage space of the 5G message center. It can be understood that, the operation of clearing the group-sending task may be implemented by setting an attribute of the group-sending task. For example, the group-sending task may be set as inactive or unavailable, such that the first node cannot acquire the group-sending file according to the group-sending task, and the 5G message center does not perform any processing in response to the receipt message of the group-sending task.

In this embodiment, the method steps executed by the 5G message center in the 5G message processing method are described. The 5G message center serves as a control center to undertake the classification of all nodes and the management of group-sending tasks. In the global management process, all the nodes are classified into a seed node and an ordinary node, such that when group-sending a 5G message, the 5G message center sends a group-sending file only to the seed node, and the ordinary node acquires the group-sending file shared by the seed node. In this process, the correctness of the group-sending file received by the ordinary node from the seed node is controlled by means such as sending the first list and the verification value, thereby ensuring that the current group-sending task can be correctly executed. The method of the embodiments of the present disclosure provides a group-sending mode of "centralized signaling control, and shared transmission among terminal devices", which can greatly reduce the communication burden of the 5G message center in executing group-sending tasks, realize a local disaster recovery transmission mode, and ensure that a 5G message can be transmitted to user nodes or user terminal devices.

Figure 6:
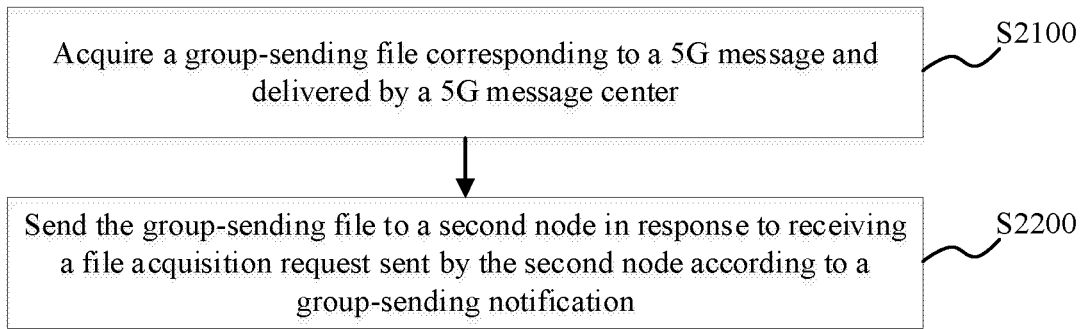
FIG. 6 is an overall flowchart of a 5G message processing method executed by a first node according to an embodiment of the present disclosure.

Referring to FIG. 6, an embodiment of the present disclosure provides a 5G message processing method, which is applied to a first node. The method includes, but not limited to, the following steps S2100 and S2200.

At S2100, a group-sending file corresponding to a 5G message and delivered by a 5G message center is acquired.

At S2200, the group-sending file is sent to a second node when receiving a file acquisition request sent by the second node according to a group-sending notification, where the group-sending notification is sent to the second node by the 5G message center, and the first node and the second node belong to the 5G message center.

The steps S2100 and S2200 are performed by the first node. According to the above division mode of the network architecture, the first node serves as a seed node and is a first-choice node for the 5G message center to send a group-sending file to. The first node directly acquires the group-sending file corresponding to the 5G message from the 5G message center, and when receiving a file acquisition request from a second node, sends the group-sending file to the second node. Because the transmission between the first node and the second node is implemented in a sharing mode, the current first node may only send a file block of the group-sending file to the second node according to the file acquisition request. When a second node pulls different file blocks of the group-sending file from a plurality of first nodes, receiving of the entire group-sending file can be completed.

It can be understood that the first node further receives a sending notification sent by the 5G message center before receiving the group-sending file, where the sending notification is used for instructing the first node to enter a state of being ready to receive the group-sending file. When receiving the sending notification, the first node returns authentication information of the current first node to the 5G message center. The 5G message center determines whether the current first node has permission to receive the group-sending file according to the authentication information returned by the first node. When the authentication is passed, the 5G message center sends the group-sending file to the first node.

Figure 7:
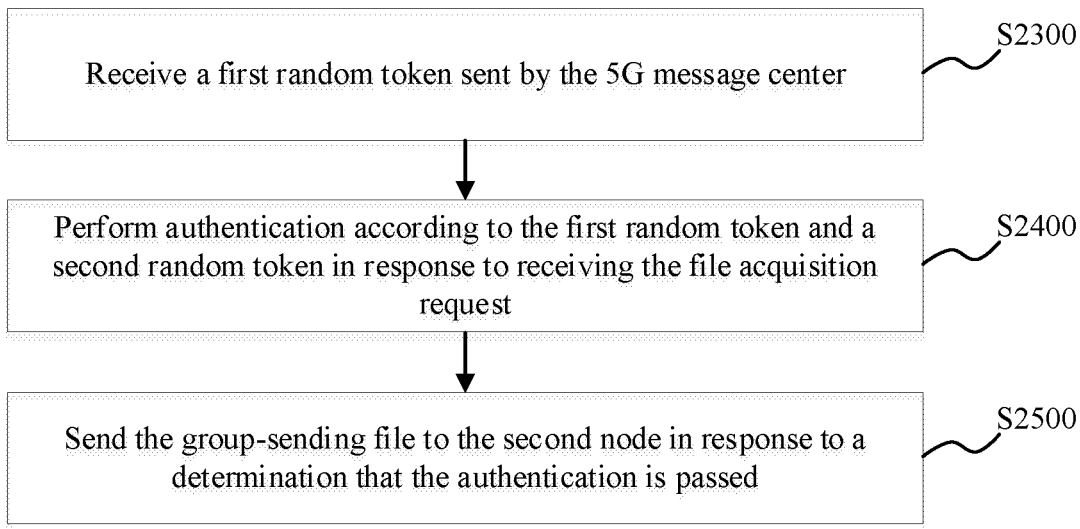
FIG. 7 is a method flowchart of a strong authentication mode executed by a first node according to an embodiment of the present disclosure.

Referring to FIG. 7, in the method of the embodiments of the present disclosure, when a strong authentication mode needs to be executed in the process of transmitting the group-sending file, the first node needs to further perform the following steps S2300 to S2500.

At S2300, a first random token sent by the 5G message center is received.

At S2400, authentication is performed according to the first random token and a second random token when receiving the file acquisition request.

At S2500, the group-sending file is sent to the second node when it is determined that the authentication is passed.

The second random token is from the 5G message center and is carried and sent by the file acquisition request. According to the method steps of executing the strong authentication mode by the 5G message center, it can be known that the 5G message center sends the first random token to the first node and the second random token to the second node, and the random tokens are used for authentication during transmission of the group-sending file between the first node and the second node. Therefore, in this embodiment, when the first node serving as a seed node receives the file acquisition request sent by the second node, the first node parses the second random token carried in the file acquisition request, and determines whether the group-sending file can be sent to the second node or which group-sending file to send to the second node by matching the second random token against the first random token.

The above steps are executed by the first node serving as the seed node when processing the group-sending task. By using the first node to receive the group-sending file from the 5G message center for download by the second node, the idle computing power of the first node/terminal device is utilized, thereby reducing the communication burden of the 5G message center and improving user experience of mass sending of 5G messages. It can be understood that, in addition to the above steps, the first node may further perform other network communication and signal processing steps, such as communicating with the management device of the user network to report the status of the current node, etc. Those having ordinary skills in the art can set other functions of the first node according to the specific situation of the current network architecture.

Figure 8:
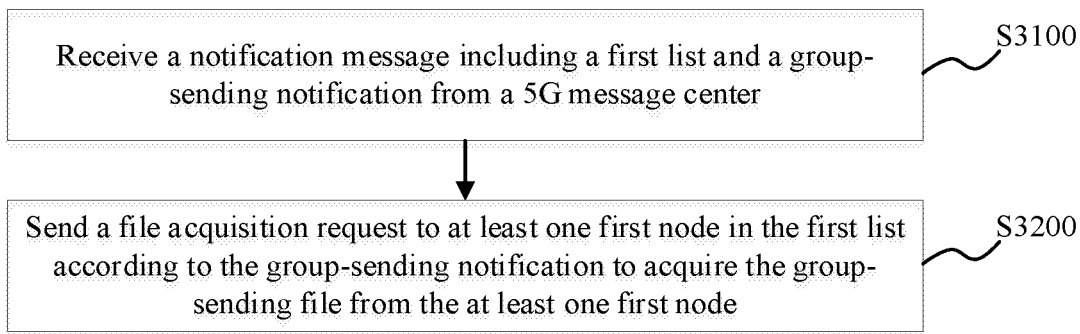
FIG. 8 is an overall flowchart of a 5G message processing method executed by a second node according to an embodiment of the present disclosure.

Referring to FIG. 8, an embodiment of the present disclosure provides a 5G message processing method, which is applied to a second node. The method includes, but not limited to, the following steps S3100 and S3200.

At S3100, a notification message including a first list and a group-sending notification from a 5G message center is received, where the first list is generated by the 5G message center according to node information of a first node, and the first node stores a group-sending file directly sent by the 5G message center.

The second node, as an ordinary node, does not directly acquire the group-sending file corresponding to the group-sending task from the 5G message center, but acquires the group-sending file from a first node serving as a seed node. To determine whether the second node needs to acquire the group-sending file and determine a first node from which the mass-sent file can be acquired, the 5G message center sends the notification message including the first list and the group-sending notification to the second node. The first list is used as a seed node list to record the node information of the first node. The second node may select a plurality of first nodes according to the first list and pull the group-sending file from the selected first nodes. The group-sending notification is used for informing the second node to receive the group-sending file and triggering the second node to execute the pull operation. It can be understood that when the second node receives the notification message, the first nodes should have completed the receiving of the group-sending file and have met a condition for sending the group-sending file.

At S3200, a file acquisition request is sent to at least one first node in the first list according to the group-sending notification to acquire the group-sending file from the at least one first node.

The first list is a list of all seed nodes in the current region or the current network, and for a second node, not all the seed nodes in the first list can provide the group-sending file to the second node. Therefore, to improve the transmission speed and ensure the transmission quality of the group-sending file, a plurality of first nodes capable of data transmission may be selected or a plurality of first nodes with good transmission quality may be preferentially selected, and the group-sending file is pulled from the selected plurality of first nodes.

It can be understood that an object that the second node pulls from a first node may be the entire group-sending file or a file block of the group-sending file. If the second node pulls file blocks of the group-sending file, the second node should know which file blocks of the group-sending file are missing locally. When sending a file acquisition request to the first node, the second node adds information of the file blocks that need to be pulled into the file acquisition request, such that the first node sends those missing file blocks according to the file acquisition request. By using a plurality of first nodes to provide different file blocks to the second node, rapid sharing of the group-sending file can be realized.

Figure 9:
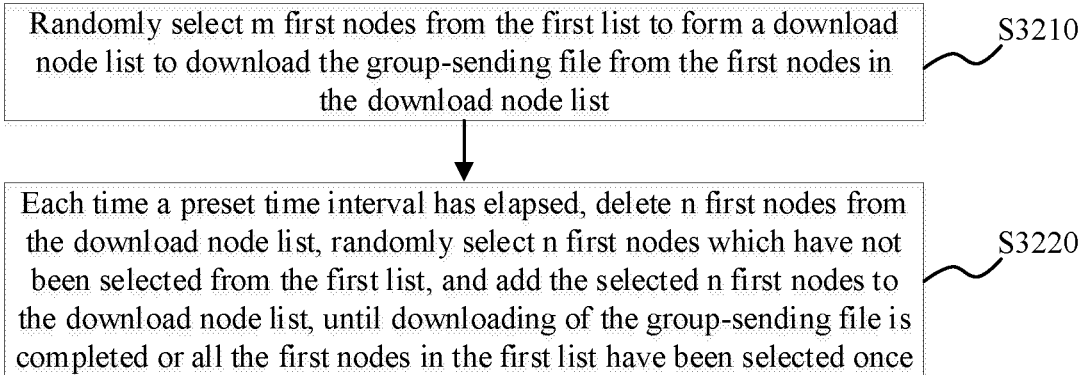
FIG. 9 is a method flowchart of selecting a seed node by a second node according to an embodiment of the present disclosure.

In S3200, the seed nodes may be selected in the following manner to improve the speed of acquiring the group-sending file. Referring to FIG. 9, S3200 includes, but not limited to, the following steps S3210 and S3220.

At S3210, m first nodes are randomly selected from the first list to form a download node list to download the group-sending file from the first nodes in the download node list, where m is a positive integer and is determined according to a quantity of first nodes in the first list.

At S3220, each time a preset time interval has elapsed, n first nodes are deleted from the download node list, n first nodes which have not been selected are randomly selected from the first list and added to the download node list, until downloading of the group-sending file is completed or all the first nodes in the first list have been selected once, where n is a positive integer, and n is less than m.

The second node executes an optimal seed node algorithm by performing the above steps. To be specific, the second node selects m seed nodes from the first list to establish a download node list, downloads the group-sending file from the first nodes in the download node list, discards n seed nodes with the slowest download speed after the download speeds are stabilized for a period of time (each time one preset time interval has elapsed), and randomly selects n seed nodes from the seed nodes which have not been selected in the first list to execute downloading, to replace the discarded n seed nodes. In the process of selecting n seed nodes, the download speeds of the m seed nodes may be sorted first, for example, in a descending order, then the last n seed nodes obtained through sorting are selected, and the second node is disconnected from those seed nodes. It can be understood that, n is certainly less than m to ensure that at least one seed node can provide the group-sending file after n seed nodes are discarded. By repeatedly performing the above step S3220, the download speed of the group-sending file by the second node can be continuously updated, thereby speeding up the download of the file. When all the nodes in the first list have been selected once, the second node may select some first nodes having higher speeds in the history to re-establish a connection to these nodes, so as to obtain a maximum download speed.

Through the above steps, it can be ensured that the first nodes selected by the second node can acquire the group-sending file at a high speed, so as to shorten the time for the second node to receive the group-sending file, and improve user experience provided by the second node.

Figure 10:
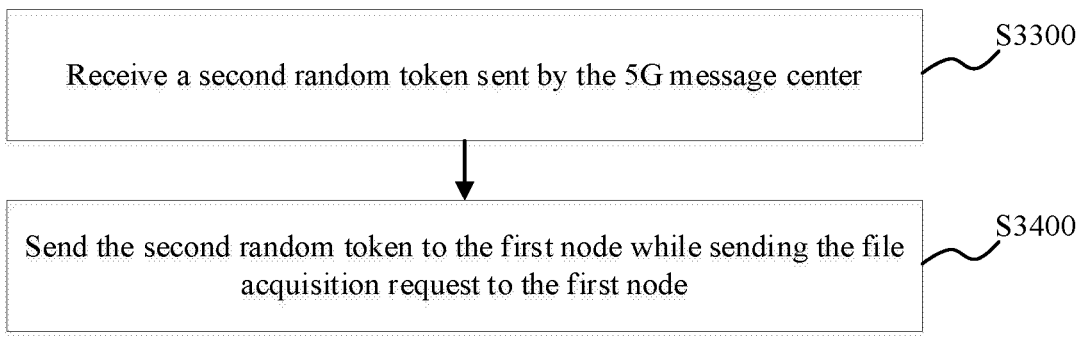
FIG. 10 is a method flowchart of a strong authentication mode executed by a second node according to an embodiment of the present disclosure.

In the process of pulling the group-sending file, a strong authentication mode may further be executed in this embodiment. Referring to FIG. 10, the second node executes the strong authentication mode by performing the following steps S3300 and S3400.

At S3300, a second random token sent by the 5G message center is received.

At S3400, the second random token is sent to the first node while sending the file acquisition request to the first node.

According to the operation manner of the strong authentication mode described above, it can be known that the 5G message center sends the first random token to the first nodes while sending the second random token to the second nodes, and the first random token and the second random token correspond to the same group-sending file. When requesting to pull the group-sending file from the first nodes, the second node sends a file acquisition request carrying the second random token to the first nodes, such that the first nodes compare the first random token with the second random token to determine which group-sending file the second node is to pull or determine whether the second node is allowed to pull the group-sending file.

Figure 11:
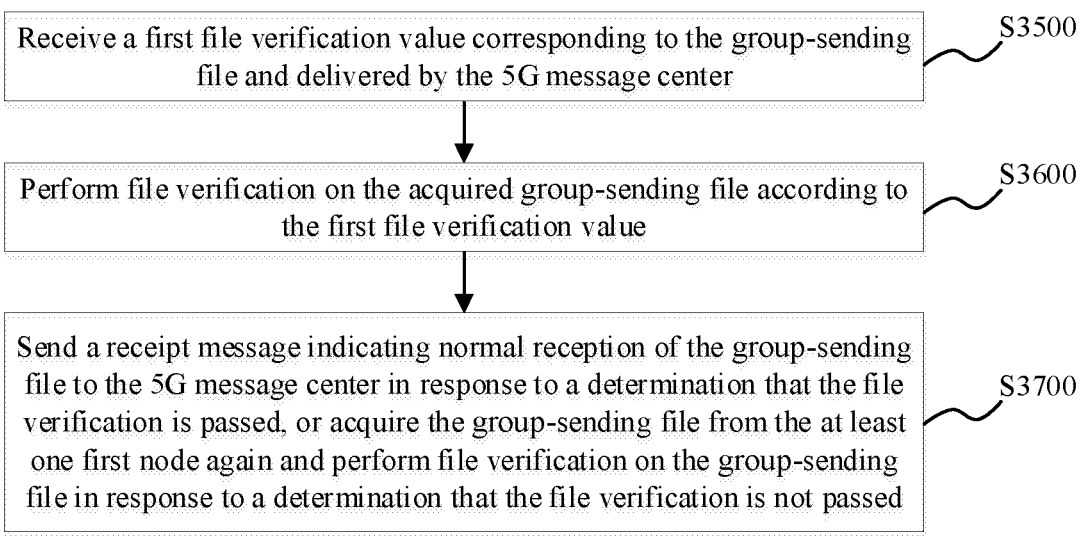
FIG. 11 is a method flowchart of sending a receipt message by a second node according to an embodiment of the present disclosure.

In addition to the use of the strong authentication mode to ensure the transmission quality of the group-sending file, verification may further be adopted to ensure the correctness of the received group-sending file. The verification value is delivered to the second node by the 5G message center, and the second node performs file verification after completing the receiving of the group-sending file, and determines subsequent processing operations according to the verification result. Referring to FIG. 11, the verification process includes, but not limited to, the following steps S3500, S3600, and S3700.

At S3500, a first file verification value corresponding to the group-sending file and delivered by the 5G message center is received.

The first file verification value is obtained by the 5G message center through calculation on the group-sending file, and may be carried in the notification message sent to the second node. By parsing the notification message, the second node can obtain the first file verification value for use in the subsequent file verification process.

At S3600, file verification is performed on the acquired group-sending file according to the first file verification value.

When completing the receiving of the group-sending file, the second node performs file verification on the received group-sending file according to a file verification manner corresponding to the first verification value. Similarly, there are many ways to verify a file, such as verifying a value of MD5, SHA1, or CRC32 to determine whether the file is complete. The file verification manner is not limited in the embodiments of the present disclosure, and a corresponding file verification manner may be selected according to actual requirements. However, it is apparent that the 5G message center and the second node need to use the same file verification code to verify the group-sending file, such that the second node can determine the integrity of the group-sending file according to the first file verification value.

At S3700, a receipt message indicating normal reception of the group-sending file is sent to the 5G message center when it is determined that the file verification is passed, or the group-sending file is acquired from the at least one first node again and file verification is performed on the group-sending file when it is determined that the file verification is not passed.

When the verification result indicates that the current group-sending file has passed the file verification, the second node reports the receipt message indicating normal reception of the group-sending file to the 5G message center, such that the 5G message center records the second node to a database according to the receipt message. When the verification result indicates that the current group-sending file does not pass the file verification, the second node may pull the group-sending file from the first node again. If the current file verification manner supports an integrity check of file blocks of the group-sending file, when some file blocks pulled are erroneous, the file blocks may be pulled from the first node again.

Figure 12:
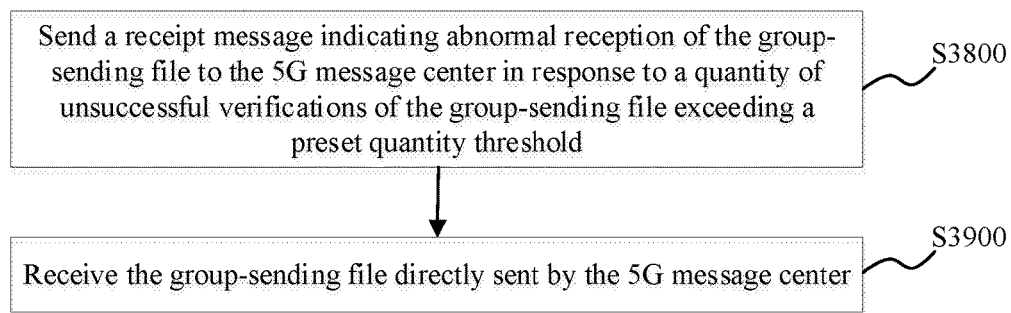
FIG. 12 is a method flowchart of directly acquiring a group-sending file by a second node according to an embodiment of the present disclosure.

It can be understood that, when the group-sending file has been pulled from the first node for multiple times but none of the pulled group-sending files passes the verification, it indicates that the group-sending file or file blocks of the group-sending file stored in some first nodes are erroneous. In this case, the second node needs to report a receipt message indicating abnormal reception to the 5G message center. Referring to FIG. 12, the method may further include the following steps S3800 and S3900.

At S3800, a receipt message indicating abnormal reception of the group-sending file is sent to the 5G message center when a quantity of unsuccessful verifications of the group-sending file exceeds a preset quantity threshold.

At S3900, the group-sending file directly sent by the 5G message center is received.

Because the group-sending files received for multiple times cannot pass the verification, the receipt message indicating abnormal reception is sent to the 5G message center. When receiving the receipt message, the 5G message center may directly send the group-sending file to the second node without forwarding through the first node, so as to ensure that the second node can directly receive the correct group-sending file. It can be understood that in some cases, the receipt message may further carry node information of a first node providing the abnormal group-sending file, and the 5G message center determines whether the corresponding first node is abnormal according to the node information in the receipt message. Of course, the node information of the first nodes selected by the second node may be carried in the receipt message, and the 5G message center checks these first nodes one by one according to the receipt message to determine which first node is abnormal.

It should be noted that the second node may fail in pulling the group-sending file from the first nodes or fail in pulling all the file blocks completely. In this case, the second node may also send a receipt message to the 5G message center, and the 5G message center may also directly send the group-sending file to the second node.

In some cases, a sending occasion of the receipt message may be set as follows. Each time the second node perform file verification, even if the group-sending file does not pass the file verification, the second node sends a receipt message to the 5G message center, to indicate that the group-sending file does not pass this file verification. The 5G message center counts a quantity of receipt messages sent from the same second node and indicating that the file verification is not passed, and when the counted quantity exceeds a threshold, directly sends the group-sending file to the second node.

To improve the sharing speed of the group-sending file, when the group-sending file received by the second node passes the file verification, the second node may announce itself as a seed node and report to the 5G message center or the management device of the user network that the second node becomes a seed node. In this case, the 5G message center or the management device of the user network creates a third list based on the first list, where the third list not only includes the first list, but also includes node information of the second node that announces itself as a seed node; and then sends the third list to other second nodes that have not completed the receiving of the group-sending file. In this way, the second nodes that have not completed the receiving of the group-sending file can select seed nodes from the third list. It can be understood that the third list is equivalent to the first list for the second nodes that have not completed the receiving of the group-sending file at this moment.

It can be understood that, information of the group-sending task also occupies some resources of the terminal device, so that the second node may also be provided with a function of regularly clearing group-sending tasks. To be specific, when a presence duration of a group-sending task (having been completed or not) in the second node exceeds a duration threshold, the second node may automatically clear the group-sending task to release the storage space. When a presence duration of a group-sending file that does not pass the verification in the second node exceeds a duration threshold, the group-sending file may also be deleted while clearing the group-sending task. Because the erroneous group-sending file is not deleted immediately when the file verification is not passed, the 5G message center may retrieve the erroneous group-sending file from the second node in a subsequent communication process to determine which first nodes are abnormal.

As the second node acquires the group-sending file from the first nodes by performing the above steps, the communication burden of the 5G message center in processing group-sending tasks can be reduced. Because the shared transmission of the group-sending file makes use of the fragmented computing power of the nodes, the sharing speed of the group-sending file can be increased, thereby improving the utilization of network resources and user experience of terminal devices.

The embodiments of the present disclosure are described below with reference to a practical example.

Figure 14:
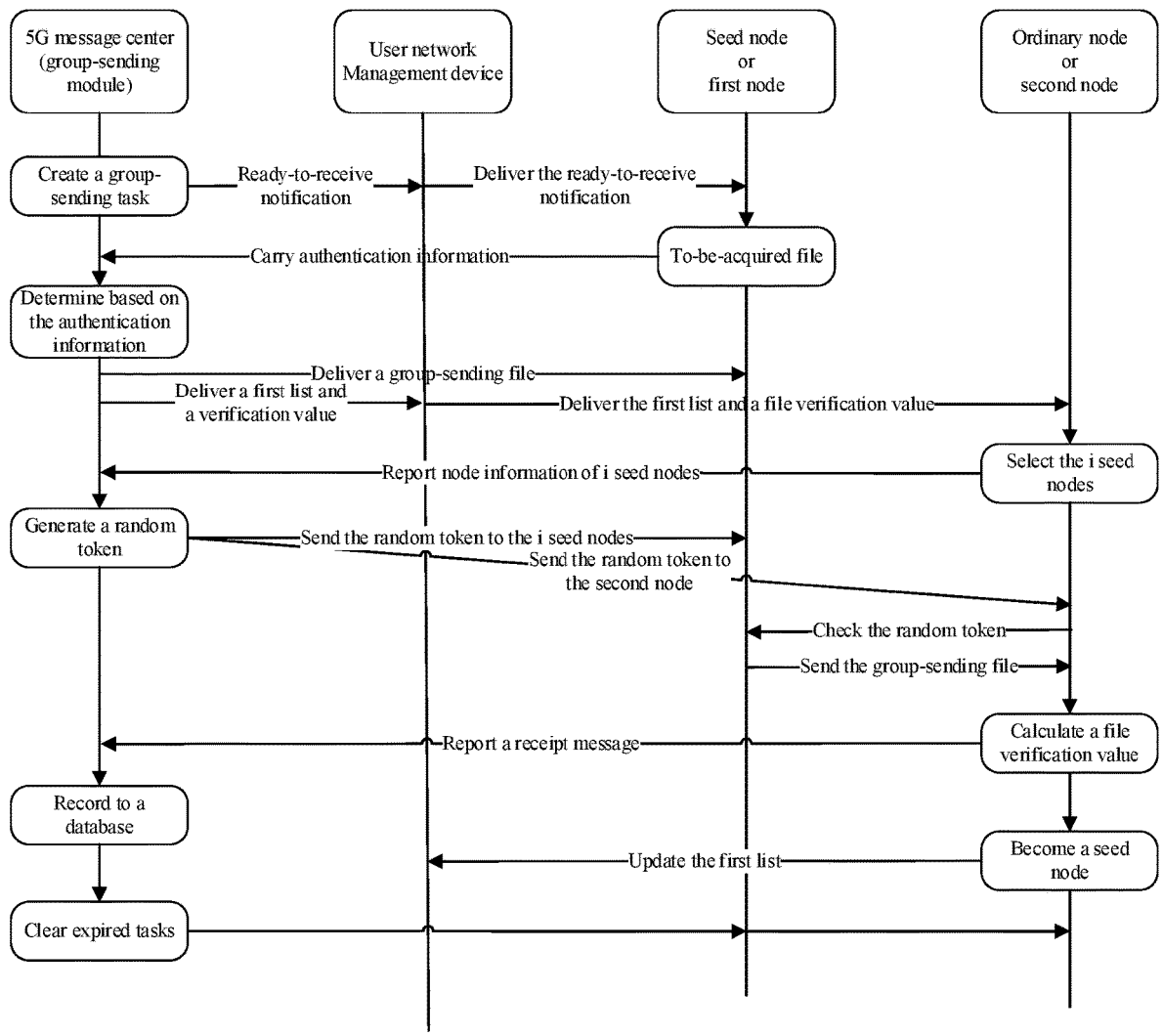
FIG. 14 is a flowchart of 5G message processing according to an embodiment of the present disclosure.

FIG. 14 is a diagram showing information exchange. In FIG. 14, for example, there is one 5G message center and one user network (where the 5G message center may further be connected to another user network, which is omitted herein for simplicity of the drawings), and the 5G message center is connected to the user network to group-send a 5G message to nodes in the user network. It is assumed that all nodes in the user network are mobile phones, and the mobile phones communicate with the 5G message center through a management device (such as a base station device) of the current user network. Based on the above network architecture, a 5G message processing method is executed, which includes the following steps.

When needing to group-send a 5G message, the 5G message center creates a group-sending task for the 5G message and generates a group-sending file corresponding to the group-sending task. The 5G message center further acquires node information of all the nodes in the user network. The node information forms a second list. The 5G message center subsequently performs centralized signaling control according to the second list.

According to the node information of all the nodes, the 5G message center classifies the nodes into a first node serving as a seed node and a second node serving as an ordinary node, and generates a first list according to node information of the first node.

The 5G message center sends, to the management device of the user network, a notification for instructing the seed node to prepare for receiving the group-sending file. The management device of the user network forwards the notification to the node recorded in the first list. If no abnormality occurs in the first node selected as the seed node, the first node enters a state of being ready to receive the group-sending file, and returns authentication information to the 5G message center.

The 5G message center receives the authentication information reported by the seed node and makes a determination according to the authentication information. If the authentication is passed, it indicates that the current first node has permission to receive the group-sending file. In this case, the 5G message center sends the group-sending file corresponding to the 5G message to the first node that passes the authentication.

The first node receives and locally stores the group-sending file delivered by the 5G message center.

When it is determined that a sufficient quantity of first nodes have completed the receiving of the group-sending file, the 5G message center sends a notification message to the second node through the management device of the user network, where the notification message carries the first list and a file verification value of the group-sending file, and is used for triggering the second node to receive the 5G message.

After receiving the first list, the second node selects m seed nodes from the first list for pulling file blocks of the group-sending file. In the process of pulling the file blocks of the group-sending file, after download durations of the m seed nodes reach a second preset time threshold, m/2 seed nodes with the lowest download speeds are selected from the m seed nodes and disconnected from the second node, and then m/2 seed nodes are selected from the seed nodes which have not been selected in the first list for downloading.

A strong authentication mode is entered. The second node uploads the node information of the selected m seed nodes to the 5G message center. The 5G message center generates a random token corresponding to the group-sending file, and sends the random token to the m first nodes serving as seed nodes and the second node.

When needing to pull a file block of the group-sending file from the first nodes, the second node sends a file acquisition request carrying a random token to the first nodes.

When receiving the file acquisition request sent by the second node, the first node parses out the random token carried in the file acquisition request for authentication, and if determining that the authentication is passed, send the file block of the group-sending file to the second node.

When the second node has acquired all the file blocks of the group-sending file from the seed nodes, the second node calculates a file verification value of the acquired group-sending file. When the calculated file verification value is consistent with the file verification value received from the 5G message center, it indicates that the received group-sending file is correct, and the second node sends a receipt message indicating that the group-sending file has been normally received to the 5G message center. If the two file verification values are inconsistent, the second node attempts to acquire the group-sending file from the seed nodes again and then perform file verification again.

If the group-sending files acquired for multiple times cannot pass the file verification, the second node sends a receipt message indicating abnormal reception of the group-sending file to the 5G message center, where the receipt message carries node information of faulty seed nodes.

When receiving the receipt message indicating that the second node has normally received the group-sending file, the 5G message center records the second node to a database. When receiving the receipt message indicating that the second node has abnormally received the group-sending file, the 5G message center directly sends the group-sending file to the second node.

The second node announces itself as a seed node after having normally received the group-sending file, and sends its node information to the management device of the user network. The management device of the user network updates the seed node list, and sends the updated seed node list to other second nodes which have not completed the receiving of the group-sending file.

The 5G message center, the first nodes, and the second nodes regularly clear expired group-sending tasks.

Through the above steps of this example, the group-sending sharing of the 5G message is realized. The 5G message center serves as a central server to execute signaling control and transmit the group-sending file to seed nodes. The group-sending file is sent to the large quantity of ordinary nodes in a shared transmission mode. Therefore, in this example, the consumption of network resources and disk IO of the 5G message center by the group-sending task can be reduced, and the capability and efficiency of the 5G message center in processing the group-sending task can be improved, thereby improving the experience of terminal device users.

An embodiment of the present disclosure provides a 5G message center, including at least one processor and a memory communicatively connected to the at least one processor, where the memory stores an instruction executable by the at least one processor which, when executed by the at least one processor, causes the at least one processor to implement the 5G message processing method executed by a 5G message center.

Figure 15:
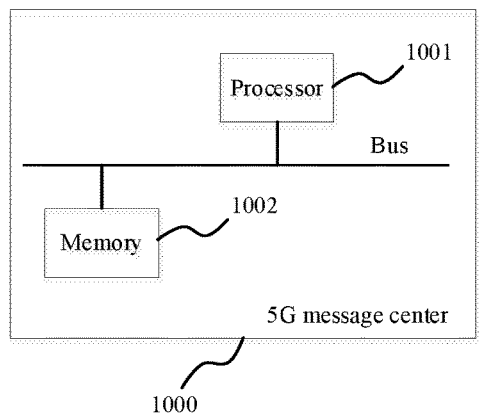
FIG. 15 is a schematic structural diagram of a 5G message center according to an embodiment of the present disclosure.

Referring to FIG. 15, for example, a control processor 1001 and a memory 1002 in a 5G message center 1000 may be connected via a bus. The memory 1002, as a non-transitory computer-readable storage medium, may be configured for storing a non-transitory software program and a non-transitory computer-executable program. In addition, the memory 1002 may include a high-speed random access memory, and may also include a non-transitory memory, e.g., at least one magnetic disk storage device, flash memory device, or other non-transitory solid-state storage devices. In some implementations, the memory 1002 includes memories located remotely from the control processor 1001, and the remote memories may be connected to the 5G message center 1000 via a network. Examples of the network include, but not limited to, the Internet, an intranet, a local area network, a mobile communication network, and combinations thereof.

Those having ordinary skills in the art may understand that the apparatus structure shown in FIG. 15 does not constitute a limitation to the 5G message center 1000, and more or fewer components than those shown in the figure may be included, or some components may be combined, or a different component arrangement may be used.

An embodiment of the present disclosure provides a terminal device, including at least one processor and a memory communicatively connected to the at least one processor, where the memory stores an instruction executable by the at least one processor which, when executed by the at least one processor, causes the at least one processor to implement the 5G message processing method executed by a first node or the 5G message processing method executed by a second node.

Figure 16:
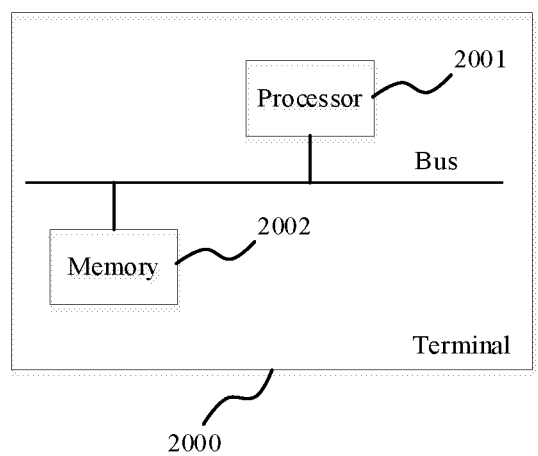
FIG. 16 is a schematic structural diagram of a terminal device according to an embodiment of the present disclosure.

Referring to FIG. 16, for example, a control processor 2001 and a memory 2002 in a terminal device 2000 may be connected via a bus. The memory 2002, as a non-transitory computer-readable storage medium, may be configured for storing a non-transitory software program and a non-transitory computer-executable program. In addition, the memory 2002 may include a high-speed random access memory, and may also include a non-transitory memory, e.g., at least one magnetic disk storage device, flash memory device, or other non-transitory solid-state storage devices. In some implementations, the memory 2002 includes memories located remotely from the control processor 2001, and the remote memories may be connected to the terminal device 2000 via a network. Examples of the network include, but not limited to, the Internet, an intranet, a local area network, a mobile communication network, and combinations thereof.

Those having ordinary skills in the art may understand that the apparatus structure shown in FIG. 16 does not constitute a limitation to the terminal device 2000, and more or fewer components than those shown in the figure may be included, or some components may be combined, or a different component arrangement may be used.

An embodiment of the present disclosure provides a computer-readable storage medium, storing a computer-executable instruction which, when executed by one or more control processors, for example, by a control processor 1001 in FIG. 15, causes the one or more control processors to implement the 5G message processing method in the above method embodiments, for example, implement the method steps S1100 to S1300 in FIG. 1, the method steps S1110 to S1120 in FIG. 2, the method steps S1121 to S1123 in FIG. 3, the method steps S1400 to S1600 in FIG. 4, or the method steps S1700 and S1800 in FIG. 5; or, when executed by a control processor 2001 in FIG. 16, causes the one or more control processors to implement the 5G message processing method in the above method embodiments, for example, implement the method steps S2100 to S2200 in FIG. 6, the method steps S2300 to S2500 in FIG. 7, the method steps S3100 to S3200 in FIG. 8, the method steps S3300 to S3400 in FIG. 9, the method steps S3500 to S3700 in FIG. 10, or the method steps S3800 to S3900 in FIG. 11.

The 5G message processing method provided in the embodiments of the present disclosure at least has the following beneficial effects. When needing to send the group-sending file to all the nodes which are to receive the 5G message, the 5G message center sends the group-sending file only to a plurality of first nodes among all the nodes. The remaining nodes are determined as second nodes. Each of the second nodes selects, according to the first list and the group-sending notification from the 5G message center, at least one first node for downloading the group-sending file. With this method, the burden brought by the 5G message center serving as a central server to send the group-sending file to all the nodes is reduced, the consumption of computing resources of the 5G message center and network resources is reduced, and the experience of users of terminal devices receiving the 5G message is improved to a certain extent.

The apparatus embodiments described above are merely examples. The units described as separate components may or may not be physically separated, i.e., they may be located in one place or may be distributed over a plurality of network units. Some or all of the modules may be selected according to actual needs to achieve the objects of the scheme of this embodiment.

Those having ordinary skills in the art can understand that all or some of the steps in the methods disclosed above and the functional modules/units in the system and the apparatus may be implemented as software, firmware, hardware, and appropriate combinations thereof. Some or all physical components may be implemented as software executed by a processor, such as a central processing unit, a digital signal processor, or a microprocessor, or as hardware, or as an integrated circuit, such as an Application-Specific Integrated Circuit. Such software may be distributed on a computer-readable medium, which may include a computer storage medium (or non-transitory medium) and a communication medium (or transitory medium). As is known to those having ordinary skills in the art, the term "computer storage medium" includes volatile and nonvolatile, removable and non-removable media implemented in any method or technology for storage of information (such as computer readable instructions, data structures, program modules, or other data). The computer storage medium includes, but not limited to, a Random Access Memory (RAM), a Read-Only Memory (ROM), an Electrically Erasable Programmable Read-Only Memory (EEPROM), a flash memory or other memory technology, a Compact Disc Read-Only Memory (CD-ROM), a Digital Versatile Disc (DVD) or other optical storage, a cassette, a magnetic tape, a magnetic disk storage or other magnetic storage device, or any other medium which can be used to store the desired information and can be accessed by a computer. In addition, as is known to those having ordinary skills in the art, the communication medium typically includes computer-readable instructions, data structures, program modules, or other data in a modulated data signal such as a carrier or other transport mechanism, and can include any information delivery medium.

Although some embodiments of the present disclosure have been described above, the present disclosure is not limited thereto. Those having ordinary skills in the art can make various equivalent modifications or replacements without departing from the scope of the present disclosure. Such equivalent modifications or replacements fall within the scope defined by the claims of the present disclosure.

The invention claimed is:

1. A 5th Generation (5G) message processing method, applied to a 5G message center, the method comprising:
   determining a first node and a second node from all nodes which are to receive a 5G message, and generating a first list according to node information of the first node, wherein the first node and the second node belong to the 5G message center;
   sending, to the first node, a group-sending file corresponding to the 5G message; and
   delivering, to the second node, a notification message comprising the first list and a group-sending notification, such that the second node acquires the group-sending file from at least one first node in the first list according to the group-sending notification.

2. The 5G message processing method of claim 1, wherein determining a first node and a second node from all nodes which are to receive a 5G message comprises:
   acquiring node information of all the nodes which are to receive the 5G message, wherein the node information is used for characterizing a network attribute of the nodes which are to receive the 5G message; and
   classifying all the nodes which are to receive the 5G message into the first node and the second node according to the node information.

3. The 5G message processing method of claim 2, wherein the node information comprises number segment data, and classifying all the nodes which are to receive the 5G message into a first node and a second node according to the node information comprises:
   grouping all the nodes which are to receive the 5G message into at least one node group according to regional information corresponding to the number segment data;
   randomly selecting at least one node from each of the at least one node group according to a preset quantity or a preset proportion as the first node; and
   determining a remaining node as the second node.

4. The 5G message processing method of claim 1, wherein the notification message further comprises a file verification value of the group-sending file, and the file verification value is used by the second node to perform file verification on the group-sending file after acquiring the group-sending file.

5. The 5G message processing method of claim 1, further comprising:
   acquiring node selection information from the second node, wherein the node selection information comprises node information of at least one first node selected by the second node from the first list;
   generating a random token corresponding to the group-sending file; and
   sending the random token to the second node and the at least one first node, such that the second node performs authentication according to the random token before acquiring the group-sending file from the at least one first node.

6. The 5G message processing method of claim 1, further comprising:
receiving a receipt message reported by the second node; and
saving node information of the second node in response to the receipt message indicating that the second node has normally received the group-sending file, or sending the group-sending file to the second node in response to the receipt message indicating that the second node has abnormally received the group-sending file.

7. The 5G message processing method of claim 1, further comprising:
deleting a group-sending task corresponding to the group-sending file in response to a presence duration of the group-sending task exceeding a first preset time threshold.

8. A 5th Generation (5G) message center, comprising at least one processor and a memory communicatively connected to the at least one processor, wherein the memory stores an instruction executable by the at least one processor which, when executed by the at least one processor, causes the at least one processor to perform the 5G message processing method of claim 1.

9. A 5th Generation (5G) message processing method, applied to a first node, the method comprising:
acquiring a group-sending file corresponding to a 5G message and delivered by a 5G message center; and
sending the group-sending file to a second node in response to receiving a file acquisition request sent by the second node according to a group-sending notification, wherein the group-sending notification is sent to the second node by the 5G message center, and the first node and the second node belong to the 5G message center.

10. The 5G message processing method of claim 9, wherein the file acquisition request carries a second random token from the 5G message center, and the method further comprises:
receiving a first random token sent by the 5G message center;
performing authentication according to the first random token and the second random token in response to receiving the file acquisition request; and
sending the group-sending file to the second node in response to a determination that the authentication is passed.

11. A terminal device, comprising at least one processor and a memory communicatively connected to the at least one processor, wherein the memory stores an instruction executable by the at least one processor which, when executed by the at least one processor, causes the at least one processor to perform the 5G message processing method of claim 9.

12. A 5th Generation (5G) message processing method, which is applied to a second node, the method comprising:
receiving a notification message comprising a first list and a group-sending notification from a 5G message center, wherein the first list is generated by the 5G message center according to node information of a first node, and the first node stores a group-sending file directly sent by the 5G message center; and
sending a file acquisition request to at least one first node in the first list according to the group-sending notification to acquire the group-sending file from the at least one first node.

13. The 5G message processing method of claim 12, further comprising:
receiving a second random token sent by the 5G message center; and
sending the second random token to the first node while sending the file acquisition request to the first node.

14. The 5G message processing method of claim 12, further comprising:
receiving a first file verification value corresponding to the group-sending file and delivered by the 5G message center;
performing file verification on the acquired group-sending file according to the first file verification value; and
sending a receipt message indicating normal reception of the group-sending file to the 5G message center in response to a determination that the file verification is passed, or acquiring the group-sending file from the at least one first node again and performing file verification on the group-sending file in response to a determination that the file verification is not passed.

15. The 5G message processing method of claim 14, further comprising:
sending a receipt message indicating abnormal reception of the group-sending file to the 5G message center in response to a quantity of unsuccessful verifications of the group-sending file exceeding a preset quantity threshold; and
receiving the group-sending file directly sent by the 5G message center.

16. The 5G message processing method of claim 12, wherein sending a file acquisition request to at least one first node in the first list according to the group-sending notification comprises:
randomly selecting m first nodes from the first list to form a download node list to download the group-sending file from the first nodes in the download node list, wherein m is a positive integer and is determined according to a quantity of first nodes in the first list; and
each time a preset time interval has elapsed, deleting n first nodes from the download node list, randomly selecting n first nodes which have not been selected from the first list, and adding the selected n first nodes to the download node list, until downloading of the group-sending file is completed or all the first nodes in the first list have been selected once, wherein n is a positive integer and is less than m.

17. A terminal device, comprising at least one processor and a memory communicatively connected to the at least one processor, wherein the memory stores an instruction executable by the at least one processor which, when executed by the at least one processor, causes the at least one processor to perform the 5G message processing method of claim 12.

* * * * *